United States Patent [19]

Eppinger

[11] Patent Number: 5,042,164
[45] Date of Patent: Aug. 27, 1991

[54] MEANS AND METHOD FOR CALCULATING THE INSTANTANEOUS SHAPE OF THE PERIPHERY OF A CROSS-SECTION OF A BODY AS IT IS BEING DEFORMED

[75] Inventor: Rolf M. Eppinger, Silver Spring, Md.

[73] Assignee: The Government of the United States as represented by the Secretary of Transportation, Washington, D.C.

[21] Appl. No.: 455,056

[22] Filed: Dec. 22, 1989

[51] Int. Cl.$^5$ .......................... G01B 7/16; G01B 7/28
[52] U.S. Cl. .......................... 33/561.2; 33/DIG. 13; 73/774; 73/12
[58] Field of Search ................. 33/561.1, 561.2, 561.3, 33/555.1, 555.4, DIG. 13, 504, 512, 514.2, 542, 543; 73/12, 866.4, 760, 774, 775; 434/274; 324/609, 610, 699

[56] References Cited

U.S. PATENT DOCUMENTS

| | | | |
|---|---|---|---|
| 3,820,529 | 6/1974 | Gause et al. | 73/774 |
| 3,908,279 | 9/1975 | Yoslow et al. | 33/558 |
| 4,573,359 | 3/1986 | Carstensen | 33/561.2 |
| 4,817,625 | 4/1989 | Miles | 33/561.2 |
| 4,910,877 | 3/1990 | Sokol | 33/DIG. 13 |

FOREIGN PATENT DOCUMENTS

| | | | |
|---|---|---|---|
| 2803520 | 11/1978 | Fed. Rep. of Germany | 33/DIG. 13 |
| 720325 | 12/1954 | United Kingdom | 33/DIG. 13 |

Primary Examiner—William A. Cuchlinski, Jr.
Assistant Examiner—C. W. Fulton
Attorney, Agent, or Firm—O. M. Wildensteiner

[57] ABSTRACT

A sensing device and an analyis process which determines the shape of the periphery of a cross-section of a body as it deforms or is defomed in time. The sensing device is a band attached to the surface of the deformable body along the external peripheral path of the desired geometrical cross-section; the band has sensing devices on it, each of which produces an output proportional to local curvature as the band is deformed. The analysis process integrates the outputs from the sensing devices to calculate the shape of the periphery of a cross-section of the body to which the band is attached.

17 Claims, 4 Drawing Sheets

MEANS AND METHOD FOR CALCULATING THE INSTANTANEOUS SHAPE OF THE PERIPHERY OF A CROSS-SECTION OF A BODY AS IT IS BEING DEFORMED

STATEMENT OF GOVERNMENT INTEREST

The present invention may be used by or for the Government of the United States for governmental purposes without the payment of any royalties thereon or therefor.

BACKGROUND

Current biomechanical research techniques for developing "injury indices" involve conducting a series of impact tests on crash subjects (i.e. crash dummies or other human surrogates), obtaining characterizations of the subjects' impact resistance by instrumenting and/or observing their motion at a number of locations, and determining the extent and severity of the resulting pathophysiology by post-test physical examination. The "injury indices" are then developed by using statistical procedures to form relationships between engineering response parameters and the resulting "injuries".

Since both accurate injury characterizations and impact response data are desired from each test, the majority of current measurement schemes obtain data from instrumentation on the external surface of the subject. These measurement schemes, because of the limited technology available, have used either miniature accelerometers attached to the periphery of the subject to characterize the impact by a series of acceleration-time histories or high speed photogrammetric techniques to obtain relative velocities and displacements between various points on the body as functions of time. Invasive instrumentation, while having the prospect of providing a more precise and detailed characterization of local structural responses, invariably introduces artifactual trauma of its own either during installation or at the time of impact. Because this artifactual trauma is impossible to differentiate from the true impact-caused trauma, invasive instrumentation has not seen wide application.

The accelerometric technique has the advantage that it can be utilized in most automotive impact tests which include belts and enveloping compliant structures such as air bags and padding, an advantage that the photogrammetric technique does not have since visual contact cannot be maintained throughout many of these impact tests. A disadvantage of the accelerometric technique is that each sensor is attached to the subject at a given external point and will experience the subject's local rotations and translations at that point if any are present. The local rotations, while impact-induced, may not contribute to the "injury" and hence tend to obscure the data of interest.

The disadvantage of the photogrammetric technique is that when testing an enveloping compliant structure such as an air bag, the bag obscures portions of the subject shortly after it deploys. Post-test visual inspection will show the permanent "injuries" received by the subject, but film analysis cannot provide a documentation of the motions that produced the "injuries".

What is needed is a means of obtaining the shape of the periphery of a cross-section of a deformable body as it is being deformed by impact, such as in a car crash, by a means that does not introduce its own trauma to the body as with invasive instrumentation or that does not add extraneous data to its output as with accelerometric devices.

The patent to Caron et al, U.S. Pat. No. 4,729,174, shows a method of determining the deviation of a surface from its desired circularity. This differs from the present invention in several aspects, not the least of which being the fact that in Caron et al the surface being measured is presumed to be circular while in the present invention there is no presumption as to the shape of the surface being measured. Further, in Caron et al the measurements can only be made on a static surface while the present invention was specifically developed to determine the deformation of a surface during a short, severe impact.

OBJECTS OF THE INVENTION

Accordingly, it is an object of the present invention to provide a means and method for accurately measuring and determining the geometric shape of the periphery of a cross-section of a body and the change in this shape as the body undergoes deformation.

It is a further object to provide such means and method which do not require that any instrumentation be inserted into or through the body.

It is a further object to provide such means and method which do not require visual observation to obtain their data.

SUMMARY

Briefly, the present invention comprises a thin metal band with sensors on it that is fastened to the periphery of the body whose shape and deformation with time are to be measured. The sensors are placed at known intervals along the band and are calibrated so that each sensor's output corresponds to and is proportional to the curvature of the band at the point where it is located. The band is attached to the body and the outputs of all sensors are recorded for each moment in time for which the peripheral shape of the body is desired. The recorded outputs of the sensors are later mathematically processed to produce the shape of the periphery of the body for each instant of time.

DESCRIPTION OF THE PREFERRED EMBODIMENT

Figure 1:
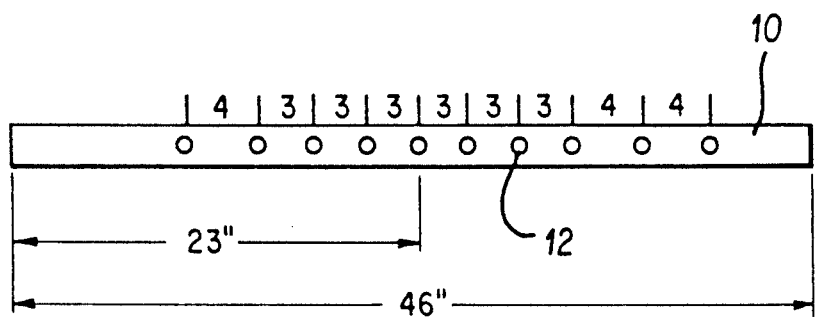
FIG. 1 is an overall view of the flexible band of the present invention.

The present invention was developed for measuring the deformation of a crash subject's chest during an automobile crash; however, it will be appreciated that it can be used for many other applications. As shown in FIG. 1, the present invention comprises a steel band 10 that is ½ inch wide, 0.015 inch thick, and 46 inches long. Steel band 10 is fastened around the chest of the crash subject or other body whose deformation is to be measured. Since steel band 10 is longer than the circumference of the subject's chest its ends are overlapped and clamped, and then band 10 is lightly fastened to the subject's surface. Mounted at intervals along band 10 are ten indicating means or sensors 12, each of which consists of a set of four strain gauges 14 forming a four active arm bridge (see FIGS. 3 and 4) as is well known in the art. Although four active arm strain gauge bridges are shown, it will be appreciated that any device or technology that senses local curvature can be used.

Figures 3, 4:
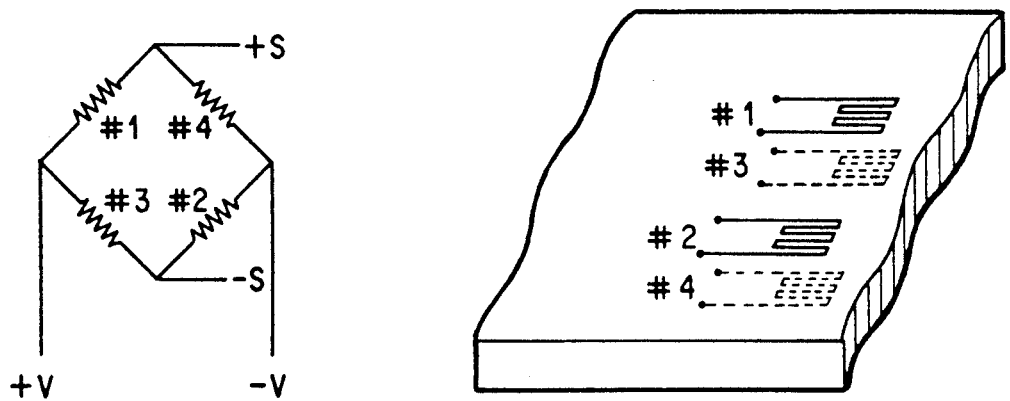
FIG. 3 shows the positioning of the strain gauges for each of the four active arm bridges on the flexible band of the present invention.
FIG. 4 shows the electrical connections for the strain gauges of each of the four active arm bridges on the flexible band of the present invention.

The spacing of the bridges along the band is dictated by the intended use of the band. For this application it was intended to be placed around the chest of a crash subject to measure the deformation of its chest as a result of the forces exerted by the restraint device (i.e. the shoulder belt of a lap-shoulder belt system or an air bag) or the steering wheel during a crash. Hence the bridges were more densely spaced in the region that would be exposed to the greatest deformation. The strain gauges are model EA-06-250MQ-350 made by Micro Measurements, Raleigh, N.C. Each bridge 12 is configured to be sensitive to bending along the length of steel band 10, hence gauges 1 and 2 of each set are placed on one side of band 10 and gauges 3 and 4 ar placed on the other side as shown in FIG. 3.

The four active arm bridge configuration allows the bridges to negate the effects of longitudinal tension as well as temperature effects in band 10 while maintaining their sensitivity to bending. Each bridge was individually calibrated by placing band 10 over a series of circular mandrels of different radii and simultaneously noting the normalized bridge output voltage (mV/V) and the band's curvature.

Figure 2:
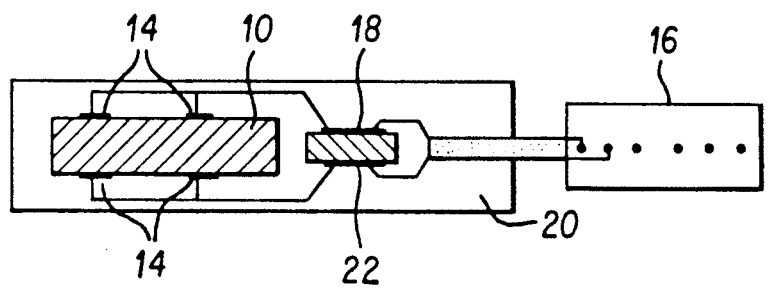
FIG. 2 shows a cross-section of the flexible band and associated components of the present invention.

Because band 10 is so thin it was found that in order to get consistent and uniform calibration and performance from the bridges it was necessary to route all lead wires from the bridges laterally away from band 10 to a harness 16 that was parallel to band 10 (see FIG. 2). Otherwise the wires locally stiffened the band to such an extent that consistent performance was not possible. To accomplish this the lead wires from strain gauges 14 were soldered to solder pad 18, which is a thin plastic strip which has been "tinned" to accept solder. Connecting cable 20 connects the leads from solder pad 18 to harness 16. Band 10 and solder pad 18 are then encased in rubber or other potting compound 22 for added protection.

Band 10 can be made of almost any type of material; the only criteria, other than flexibility and resilience, are that it have a high yield stress so that it does not take a permanent bend during a particularly violent crash and that it have sufficient tensile strength to not stretch or break during a test. These criteria usually require the use of steel as the band material.

Figure 5A:
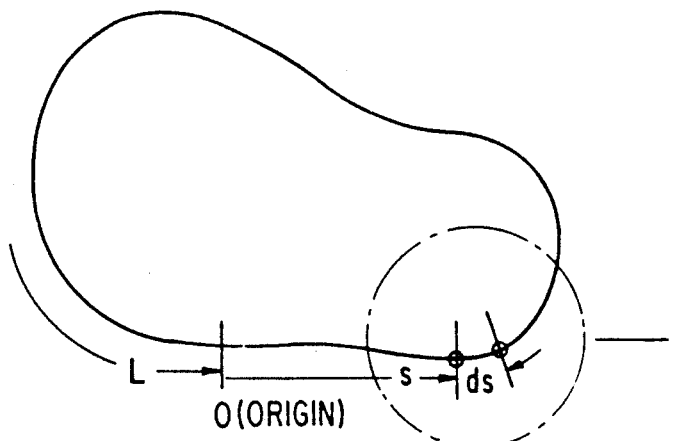
FIGS. 5a and 5b show the layout and derivation of the formulas used to correlate the outputs of the strain gauges on the flexible band of the present invention.
Figure 5B:
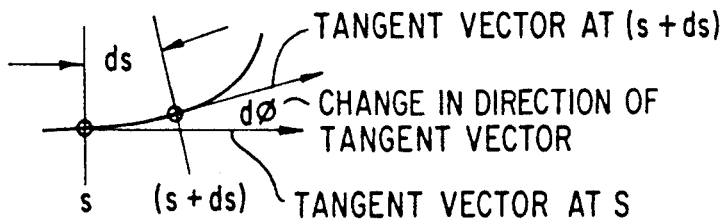

The method of converting the output of the sensors, which is a voltage proportional to the curvature of the band at each sensor location, to a complete description of the shape of the periphery of a cross-section of the body to which it is attached, is as follows. It is analytically recognized that the geometric shape of the band or any plane curve can be fully and uniquely determined if its local curvature k(s) is known as a continuous function of the position s along the length of band 10, where k(s) is defined as the differential change in direction of the tangent vector divided by the differential distance along band 10 ($d\phi/ds$) (see FIGS. 5a and 5b), and s is the distance along the band in a specific direction from an arbitrary reference point on the band.

Figure 6:
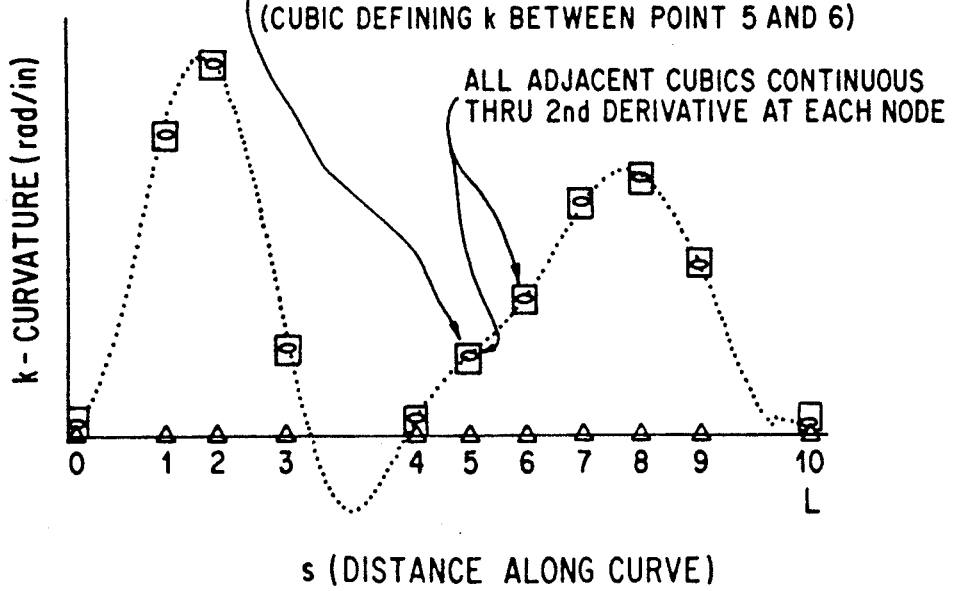
FIG. 6 shows the conceptual layout of the analytic routine which generates the curvature of band 10 along its length.

Since the band provides only a finite number of physical measurements of the curvature at "n" known points along its length, a process was developed which constructs a continuous approximation of the true k-s curve given only "n" measured values of the curvature at the known locations along the length of the closed curve. For the present embodiment there were ten active arm bridges on band 10. Using an IMSL [1] subroutine ICSPLN, an interpolatory cubic spline was generated consisting of 10 cubic equations, each one valid between a pair of adjacent curvature values, where each cubic passes through the curvature value on its left and on its right as well as being continuous through the second derivative with the cubics on its left and right. Continuity through the second derivative is also maintained between the last and first cubics (see FIG. 6).

It will be appreciated that the object is to construct a continuous curve through the "n" measured curvature values and that the actual method of calculation is not critical. For example, a Fourier series or a polynomial series could be used in place of the interpolatory cubic spline method described herein.

Once the continuous k-s representation of the closed curve is developed by any of the above methods, the graphical generation of the actual curve is accomplished on the computer using discrete mathematics. The technique developed starts at an arbitrary point, which is the origin "0" on the x-y plane on which the curve is to be plotted, and proceeds a short distance ds (where ds should be equal to or smaller than 1/100 of the length of band 10) along the band. At this point the direction of travel is changed by an amount $d\phi$, where $d\phi$ is equal to the area under the k-s curve between the starting and ending points $s_1$ and $s_2$ respectively of the most recent incremental distance ds, and another incremental step is taken to the next point in the new direction. This process is repeated until the total length of the incremental steps ds equals the length of band 10. Sequentially connecting the points then generates the closed curve defined by the k-s representation.

Since the splined k-s representation of the closed curve is only an approximation of the curve's true k-s representation, differences between the shape of the periphery calculated from the k-s approximation and the true shape of the periphery may occur. These differences manifest themselves as (1) the tangents to the curve at its beginning and end not being parallel, and/or (2) the developed curve not achieving closure—that is, the first and last points of the curve are not coincident. To eliminate these errors, the k-s approximation curve is adjusted in a two-step process.

The first step, which addresses the non-tangency condition, adjusts the k-s curve so that its integral with respect to s over the total length L of the curve is equal to $2\pi$. This guarantees that the tangent vector rotates one full revolution as it traverses the length of the curve. The current embodiment determines a constant additive correction factor "e" which is added to the splined k(s) function such that the equality $$\phi(s) = \int_0^L (k(s) + e)ds = 2\pi \quad (1)$$

is satisfied. Alternative correction methods have been devised, such as a multiplicative one, where the correction factor e modifies the curvature function as in equation (2) and its value determined such that it satisfies the same equality. That is, $$\phi(s) = \int_0^L (ek(s))ds = 2\pi. \quad (2)$$

The second step, achieving closure of the plotted curve, is accomplished by further modifying the curvature function with two additional terms as follows:

$$\phi(s) = \int_0^L [(k(s) + e) + k_x\cos(2\pi s/L) + k_y\sin(2\pi s/L)]ds \quad (3)$$

Figure 7:
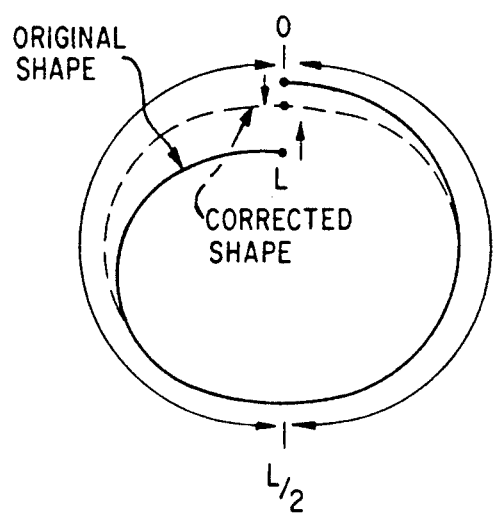
FIG. 7 shows the way that the calculated shape is corrected for lack of vertical closure by adjusting the k-s curve.
Figure 8:
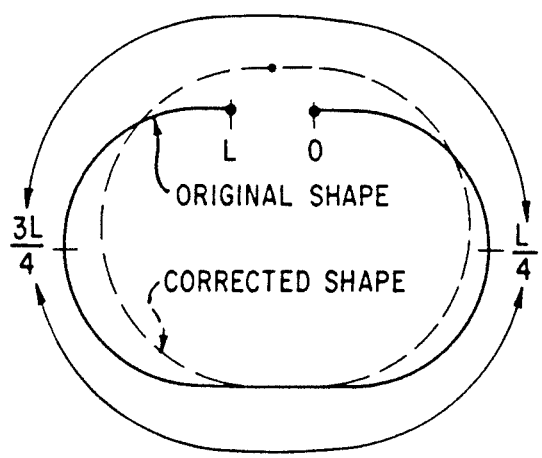
FIG. 8 shows the way that the calculated shape is corrected for lack of horizontal closure by adjusting the k-s curve.

The first term, $k_x\cos(2\pi/L)$, adjusts for lack of horizontal closure (see FIG. 8) by decreasing (increasing) curvature when $k_x$ is positive (negative) in that portion of the curve from $s=L/4$ to $s=3L/4$ and increasing (decreasing) curvature in that portion of the curve from $s=3L/4$ to $s=L/4$. The second term, $k_y\sin(2\pi/L)$, adjusts for any lack of vertical closure (see FIG. 7) by increasing (decreasing) curvature when $k_y$ is positive (negative) in that portion of the curve between $s=0$ and $s=L/2$ and decreasing (increasing) curvature in that portion of the curve between $s=L/2$ and $s=L$.

The determination of the particular $k_x$ and $k_y$ values that achieve closure of a calculated peripheral shape is made by employing an iterative process which is under the control of an optimization program. The particular optimization program used in the preferred embodiment is the routine ZXMWD from the IMSL library. In each step of this iterative process the optimizer routine chooses values for $k_x$ and $k_y$, calculates the associated peripheral shape, determines the distance between the ends of the unclosed curve, and based on this current closure distance and its associated $k_x$ and $k_y$ together with the previous distances and their associated $k_x$ and $k_y$ values determines a new set of $k_x$ and $k_y$ values. This is repeated until a set of $k_x$ and $k_y$ values is found that reduces the closure distance to zero. These $k_x$ and $k_y$ values are the ones that are used to determine the final shape of the cross-section of the body. Because the integral of either of the two correction terms over the entire length of the curve from 0 to L is zero regardless of the values of $k_x$ and $k_y$, the 2 constraint for tangency remains unaffected and still valid.

Both in the generation of the continuous k-s representation of the curve given the discrete measured curvature values and in the determination of the two factors $k_x$ and $k_y$ necessary to achieve closure, software programs licensed by the IMSL Corporation, Houston, Texas were used to advantage in the present invention. However, there are many such subroutine packages on the market and any of them would work equally well.

It is obvious that the accurate duplication of a specific closed curve by this technique is dependent on both the spatial frequency of the curve's curvature, k, along the length of the curve and the number of curvature measurements made along the length of the curve. That is, if only circles being deformed into ellipses are under observation, then between 2 and 4 curvature measurements could easily characterize the entire shape and its changes accurately. However, if a highly convoluted shape where the curvature varies rapidly and often with respect to s is under observation, then many more measurements of local curvature must be made in order to accurately duplicate the k-s curve, which in turn can accurately generate the closed curve's geometry.

Figure 9:
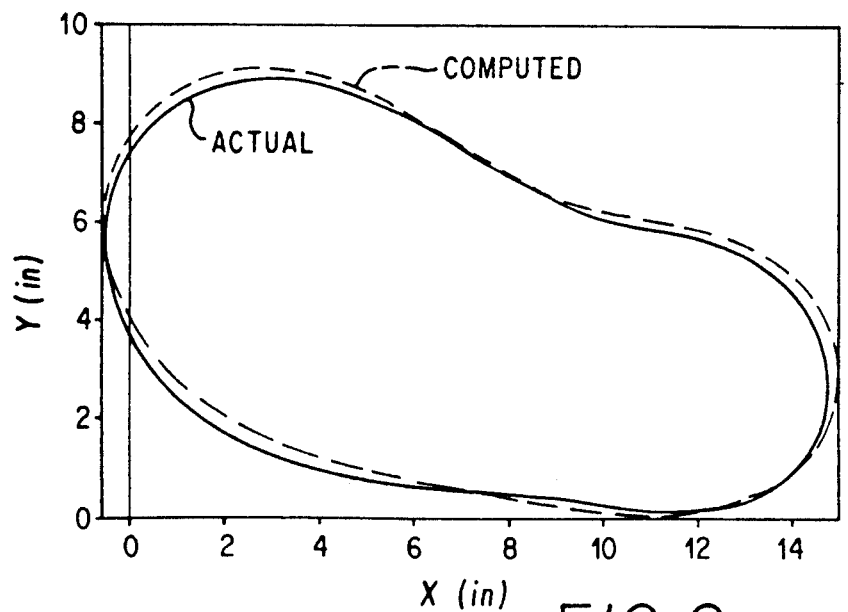
FIG. 9 shows the correlation between actual and calculated shapes for a static flexible band of the present invention.
Figure 10A:
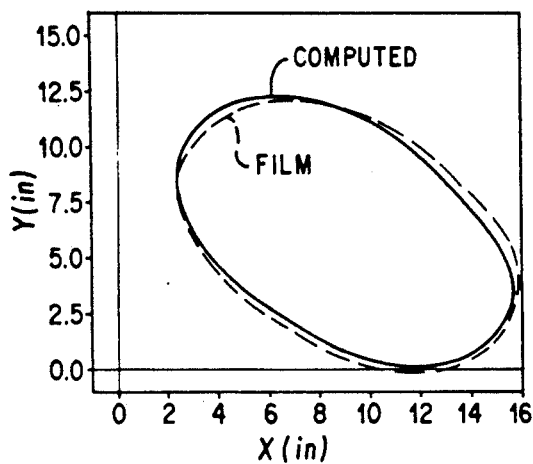
FIGS. 10a, 10b, 10c, and 10d show the correlation between calculated and actual shapes at 0, 28, 56, and 70 milliseconds, respectively, during a dynamic impact test of the flexible band of the present invention.
Figure 10B:
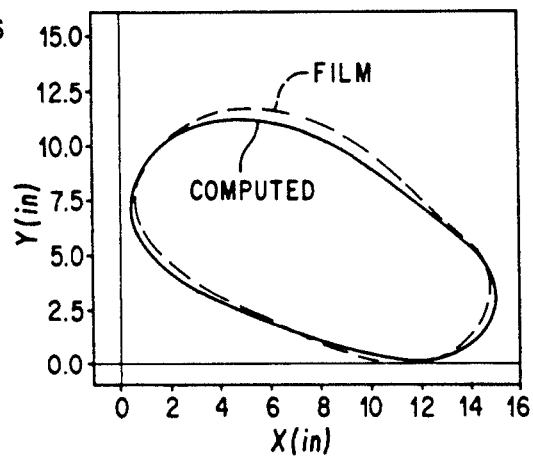
Figure 10C:
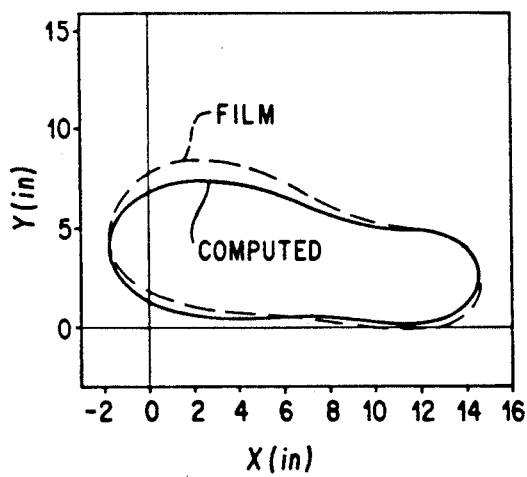
Figure 10D:
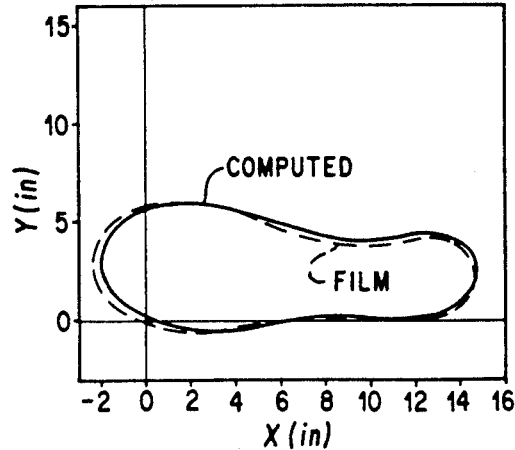

Both static and dynamic tests were conducted to examine the accuracy of the present measurement device. In the static tests, the instrumented band was joined end to end, its peripheral length noted, and then held statically in a deformed shape on a horizontal working surface. The specific shape of the band was then transferred to an underlying sheet of paper while the output of the individual bridges was electronically recorded. The graphical shape recorded on the paper was then digitized into a series of x-y points defining the band's shape using an electronic plot board while the electronic output from the sensors was processed by the algorithms discussed previously. Both cross-sectional shapes, that is, the one from the graphical process and the one from the electronic data, were then graphically superimposed and plotted by computer. FIG. 9 shows the results of this process.

For the dynamic testing, the instrumented band was wrapped around an ellipsoidal slab of foam and dynamically deformed by pushing an impactor into it at high speed. The band's geometric shape was recorded throughout the event via high speed cinematography while the electronic data from the strain gauges were being sampled and recorded at 4,000 cycles per second. An electronic strobe light in the field of view marked the initiation of the sampling process and allowed synchronization of the film images to the electronic data. The band's geometric shape was determined from the film at several event times using an image digitizing process. The electronic data corresponding to the various digitized visual images were then processed by the appropriate algorithms and each pair of images graphically superimposed. The results of this process are shown in FIGS. 10a–10d.

Both the static and dynamic testing demonstrate that the sensing device of the present invention has the capability of capturing the geometric shape of an object around which it is wrapped with an accuracy of plus or minus ¼ inch. It is to be emphasized that the accuracy of the device is a function of both the complexity of the shape being measured and the total number of sensing elements (i.e. four active arm bridges) placed on the band and their location. If a given configuration is not accurate enough, it will usually be sufficient to increase the number of sensing devices on the band to gain the required accuracy.

I claim:

1. Means for instantaneously calculating the shape of the periphery of a body comprising an inextensible band surrounding said periphery and indicating means on said band for producing an output which is an indication of the curvature of a part of said band at a given instant of time.

2. Means as in claim 1 further including analytical means for correlating the outputs of said indicating means to calculate said shape.

3. Means as in claim 1 wherein said indicating means for producing an output comprises means for sensing local curvature and producing an output that is proportional to said curvature.

4. Means as in claim 3 wherein said indicating means for producing an output comprises strain gauges arranged in at least one four active arm bridge.

5. Means as in claim 2 wherein said analytical means for correlating the outputs of said indicating means comprises means for constructing a continuous approximation of the band's true curvature versus length from the outputs of said indicating means.

6. Means as in claim 5 further including means for converting said continuous approximation of the band's true curvature versus length to the shape of the periphery of said body.

7. Means as in claim 6 wherein said means for constructing said continuous approximation of the band's true curvature comprises an interpolatory cubic spline.

8. Means as in claim 7 further including means for converting said continuous approximation of the band's true curvature versus length to the shape of the periphery of said body.

9. Means as in claim 8 further including means for adjusting the continuous approximation of the true curvature of said band over the total length of said band such that the integral of the curvature curve over its length is equal to $2\pi$ by either adding a constant value to the curvature versus length equation or by multiplying it by a constant value.

10. Means as in claim 9 further including means which assures that the first and last points of said curvature versus length curve are coincident.

11. Means as in claim 10 wherein said means which assures that the first and last points of said curvature versus length curve are coincident comprises means for eliminating the lack of coincidence in the horizontal direction of said first and last points.

12. Means as in claim 11 wherein said means which assures that the first and last points of said curvature versus length curve are coincident comprises means for eliminating the lack of coincidence in the vertical direction of said first and last points.

13. The method of determining the shape of the periphery of a body as it is being deformed which comprises mounting indicating means on an inextensible band, enclosing said periphery with said band, measuring the curvature outputs of said indicating means as said body is deformed, and correlating the outputs of said indicating means to generate said shape.

14. The method of claim 13 further including calibrating said indicating means prior to enclosing said body with said band.

15. The method of claim 14 further including correlating the outputs of said indicating means to generate a continuous approximation of the band's true curvature versus length from the outputs of said indicating means.

16. The method of claim 15 further including converting said continuous approximation of the band's true curvature versus length to the shape of the periphery of said body.

17. The method of claim 16 further including insuring closure of the calculated shape of the periphery of said body represented by said continuous approximation of the band's true curvature versus length.

* * * * *